Sept. 16, 1958  R. R. WILLIAMSON  2,852,459
APPARATUS FOR DETECTING AND LOCATING PRESENCE OF FLUIDS
Filed June 8, 1945  3 Sheets-Sheet 1

Witnesses:
Herbert E. Metcalf
Estill E. Ezell

Inventor:
Robert R. Williamson
By: Robert A. [Lavender]
Attorney

Sept. 16, 1958 R. R. WILLIAMSON 2,852,459
APPARATUS FOR DETECTING AND LOCATING PRESENCE OF FLUIDS
Filed June 8, 1945 3 Sheets-Sheet 2
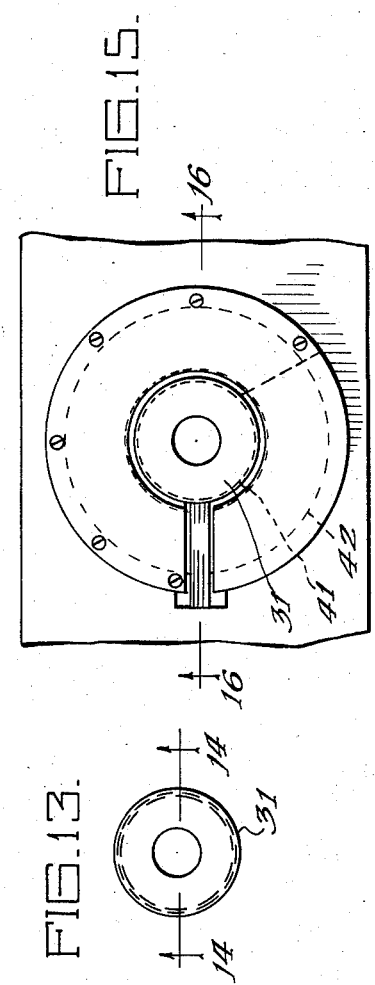
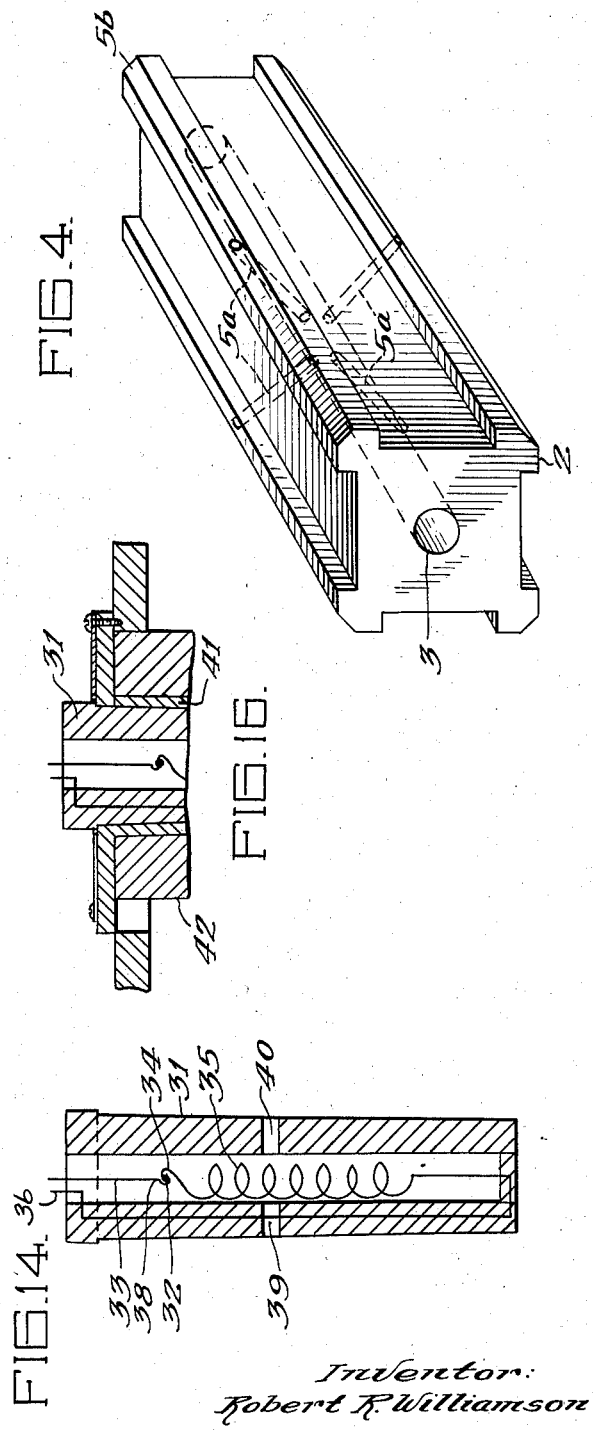
Inventor:
Robert R. Williamson Sept. 16, 1958  R. R. WILLIAMSON  2,852,459
APPARATUS FOR DETECTING AND LOCATING PRESENCE OF FLUIDS
Filed June 8, 1945  3 Sheets-Sheet 3
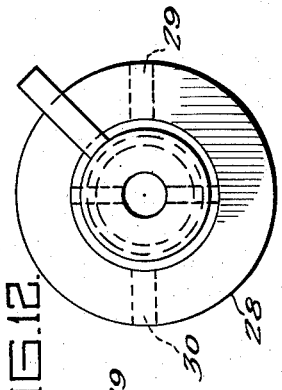
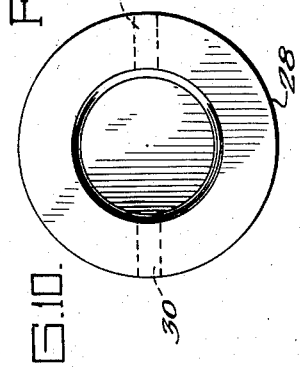
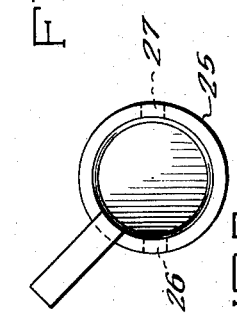
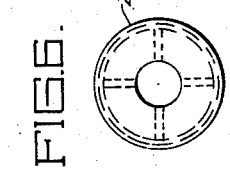
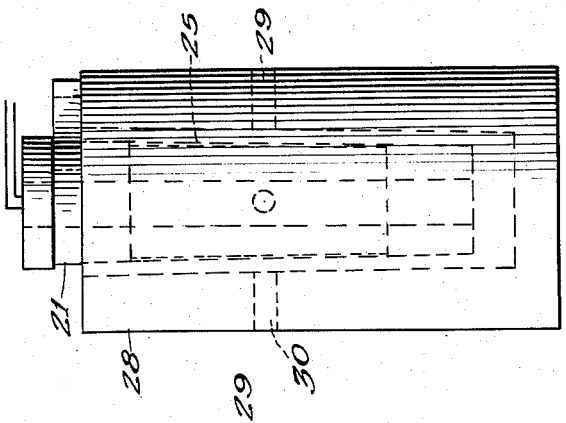
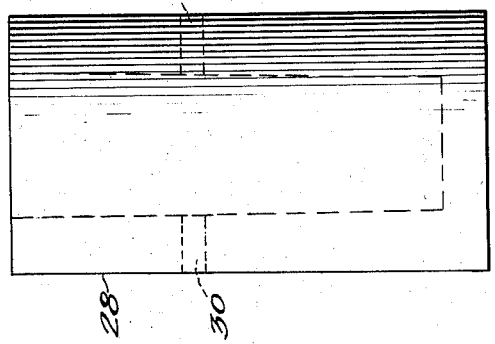
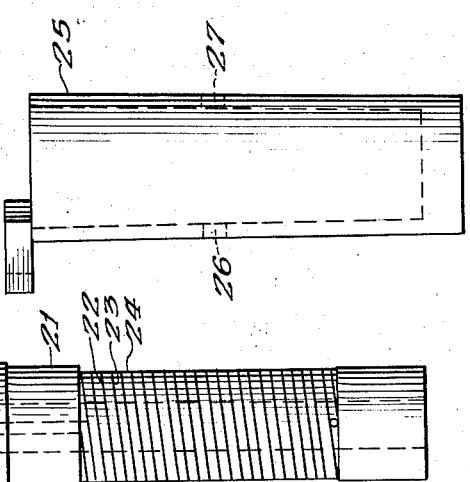
Witnesses:
Herbert E. Metcalf
Estill E. Ezell
Inventor:
Robert R. Williamson
By: Robert A. Lavender
Attorney

United States Patent Office 2,852,459
Patented Sept. 16, 1958

2,852,459

APPARATUS FOR DETECTING AND LOCATING PRESENCE OF FLUIDS

Robert R. Williamson, Hoboken, N. J., assignor to the United States of America as represented by the United States Atomic Energy Commission Application June 8, 1945, Serial No. 598,272

3 Claims. (Cl. 204—193.2)

This invention relates generally to leak detection apparatus and methods, and more particularly to an apparatus and method for detecting and locating the presence of a predetermined fluid in an enclosed space.

One of the principal objects of the present invention is to provide a novel, simple and economic apparatus and method for detecting and locating the presence of a predetermined fluid in a given space or mass of material.

A correlative object is to provide a novel apparatus and method for determining certain conditions existing in a mass of material selectively at each of a plurality of locations throughout the mass.

Other objects are to provide a novel method and apparatus to detect and locate contaminating fluids in a mass of solid or fluid material, or the dispersion of agents therethrough, whether due to internal causes or originating from external sources.

A more specific object is to provide a novel method and apparatus to detect and locate the leakage of coolant into the moderator of a neutronic reactor.

Other objects and advantages will become apparent from the following description wherein reference is made to the drawings in which:

Fig. 4 is a perspective view of a type of block of moderator material which may be used in the neutronic reactor of the type illustrated in Fig. 1;

Fig. 5 is a front elevation of an electrically operated detector element suitable for use in the present invention;

Fig. 6 is a top plan view of the detector element illustrated in Fig. 5;

Fig. 7 is a front elevation of a valve plug in which the detector is installed for operation;

Fig. 8 is a top plan view of the valve plug illustrated in Fig. 7;

Fig. 9 is a front elevation of a valve body for use with the detector element of Fig. 5;

Fig. 10 is a top plan view of the valve body illustrated in Fig. 9;

Figs. 11 and 12 are respectively a front elevation and top plan view of the assembly of the valve and detector illustrated in Figs. 5 to 10 inclusive;

Fig. 13 is a top plan view of a modified form of detector;

Fig. 14 is a longitudinal sectional view of the detector illustrated in Fig. 13 taken on line 14—14 thereof;

Fig. 15 is a top plan view of the detector of Fig. 13, assembled in a valve body; and Fig. 16 is a partial sectional view taken on line 16—16 of Fig. 15.

Figure 1:
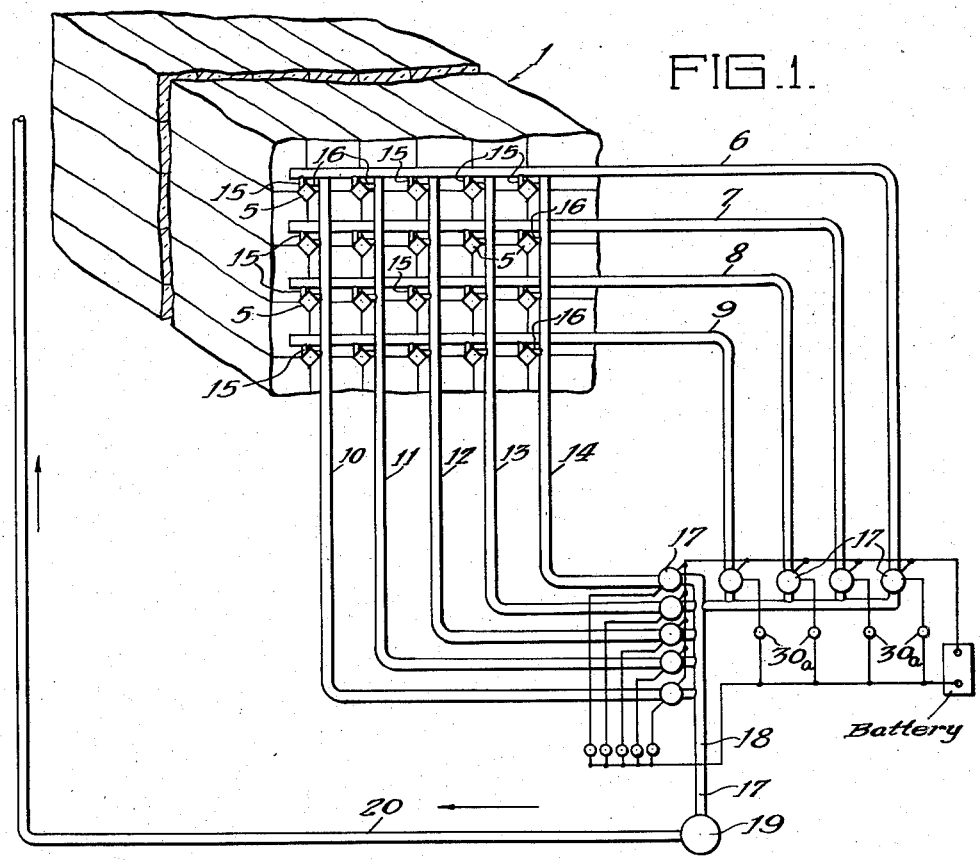
Fig. 1 is a diagrammatic perspective view of a portion of a neutronic reactor with apparatus embodying the teachings of the present invention operatively associated therewith.
Figure 3:
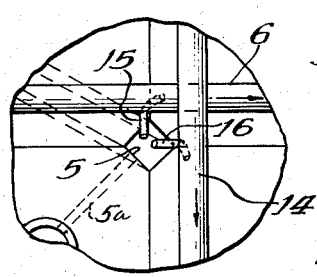
Fig. 3 is an enlarged fragmentary front elevation illustrating the manner of connection of the present apparatus to the moderator mass of the neutronic reactor illustrated in Figs. 1 and 2.

For the purpose of illustration, the present invention is described in connection with the detection and location of leakage coolant in the moderating material of a neutronic reactor.

In general, a neutronic reactor comprises a shielded enclosure, sometimes sealed, in which a neutron fissionable isotope, such as $U^{233}$, $U^{235}$, or $94^{239}$ or mixtures thereof, is subjected to fission by absorption of neutrons and a self-sustaining chain reaction is established by the neutrons evolved by the fission. In general, as described in Fermi et al. Patent No. 2,708,656, dated May 17, 1955, such reactors comprise bodies of compositions containing fissionable material such as natural uranium, disposed in a mass of neutron slowing material which slows the neutrons to thermal energies. Such a slowing material is termed a neutron moderator, and may be in the form of blocks of graphite of geometric shapes, stacked to form a large pile in a sealed enclosure or shield, with channels formed therein at selected locations for accommodating the fissionable metal in the form of rods or slugs in a manner permitting their insertion or removal without otherwise disturbing the pile. Carbon, beryllium, and $D_2O$ (heavy water) are typical moderators. Heat is evolved during the reaction which is removed by passage of a coolant through the reactor or in heat exchange relationship therewith. One manner which has been found satisfactory for the removal of heat is the continuous circulation of water through suitable pipes or conduits located within the mass of moderator material. Due to certain operating and controlling characteristics of the neutron reactor, it is necessary or desirable that the pipes for the circulation of coolant be made of aluminum of very limited thickness such, for example, as one millimeter, and the slugs of fissionable material are generally placed within the coolant pipes so as to effect a rapid heat transfer. Since the water jacket existing around the fissionable material is limited by the operating characteristics of the reactor, it is necessary that the water be forced through the pipes under considerable pressure in order to maintain an adequate flow. With thin wall tubing and pipes operating at relatively high water pressure, leakage is apt to develop due to deterioration or corrosion of the tubes and resultant thinning of the pipe walls. It is equally important for maintaining the proper reaction of the reactor that the amount of water or moisture in the moderator be maintained at a minimum and as nearly as possible eliminated. Consequently, the prompt detection both of the escape of water from the coolant pipes and of its point of entry into the moderator from any source is necessary, and steps must be taken immediately to correct the condition.

The present apparatus and method are particularly adapted for the immediate detection of the presence of the water inside of the mounting material and the location of the zone where it is present. This latter is important due to the large size of the pile and the great difficulty which would be encountered were the water permitted to permeate any appreciable portion of the moderator.

Figure 2:
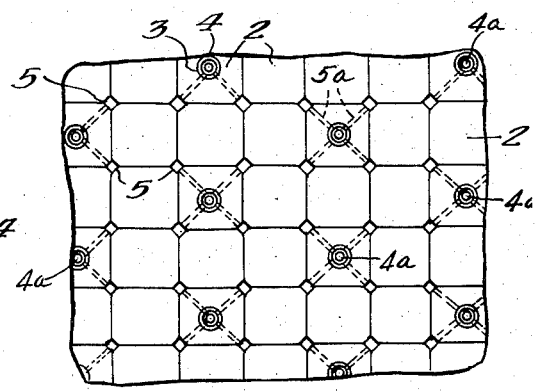
Fig. 2 is an enlarged fragmentary front elevation of the moderator material of a neutronic reactor showing the cooling pipes and fluid channels therethrough.

Referring to Fig. 1, the mass of moderating material of a neutronic reactor is indicated at 1, this mass being formed by the piling in regular geometric design of blocks 2 of moderator material such as graphite, as better illustrated in Figs. 2 and 4. The blocks 2 preferably are of a regular geometric pattern so that when piled together in regular form they form a substantially homogeneous mass which measures several feet in each dimension. If desired, certain of the blocks can be provided with grooved faces, as illustrated in Fig. 4, and others can be provided with corresponding tongues so as to interfit therewith, thus making the assembled pile more nearly a homogeneous uniform mass and assuring good contact of each block with adjacent blocks. A number of the blocks 2 are provided with longitudinal passages or bores 3 which are so arranged that the blocks can be stacked to provide continuous passages from the front to the rear of the resultant mass. These passages are arranged to accommodate aluminum pipes or tubes 4 which have generally parallel axes lying in several planes and in which are disposed slugs or cartridges 4a of a fissionable material, sufficient clearance being allowed between the inner walls of the tubes 4 and the slugs 4a for affording passage of a cooling water therethrough. The tubes 4 thus serve as containers for the cooling water within the reactor. The inlet and outlet ends of the tubes are mounted in respective headers so that the coolant may be circulated through the tubes without escaping into the moderator. The entire mass of blocks is enclosed in a suitable shield, not shown, which may be sealed to exclude outside atmosphere. Helium or other preselected gas is pumped into sealed shielded reactors under pressure in order to permeate the blocks and to circulate through the mass, the circulation generally being from rear to front of the mass.

In accordance with the present invention longitudinal ducts 5, extending generally parallel to the tubes 4 are formed in the mass. The ducts 5 are provided by bevelling the longitudinal edges of the blocks 2 at 5b so that when the blocks are assembled the ducts 5 are formed at the edges 5b of the blocks. The ducts 5 are coextensive longitudinally with the mass and have generally parallel axes that intersect a plane normal to the axes at points that lie on two sets of parallel lines, the lines of one set extending transversely to the lines of the other set, each point lying generally at an intersection of one line of one set with one line of the other set. As a result of this construction any water or water vapor escaping from the tubes 4 tends to pass to the ducts 5 rather than spread through the mass due to the more ready access afforded by the cleavage planes between the blocks. To assist in the admission of escaping water into the ducts 5, the tube carrying blocks may be provided with ducts 5a which extend radially from the central passages 3 to the longitudinal edges of the blocks. The tube carrying blocks 2 are spaced apart by solid blocks, as illustrated in Fig. 2, so that only the ducts 5 which are formed in part by a given tube carrying block are in communication with the associated passage 3 of that block through ducts 5a. As a result, detection of coolant in any duct indicates from which tube 4 the leakage has occurred. The same is true generally of any water vapor that may be formed in the blocks due to evaporation of water already present.

In order to detect and locate the presence of such water vapor in the ducts 5, a co-ordinate system of pipes is arranged at the front of the reactor and outside of the casing or shield thereof. A rectangular system of coordinates is shown for purposes of illustration in Fig. 1, though a polar coordinate system may be used, if desired. The rectangular coordinates system comprises a plurality of horizontal pipes 6, 7, 8 and 9, generally parallel to one another, and a plurality of vertical pipes 10, 11, 12, 13, and 14, generally parallel to one another, the horizontal pipes forming the abscissae of a rectangular system of coordinates and extending transversely to the vertical pipe. Each horizontal pipe has a plurality of inlet orifices or ducts 15, each of which is connected to a different duct 5 of a corresponding horizontal row of ducts 5 in the moderator material. Thus the pipe 6 is connected to the top horizontal row of ducts 5, the pipe 7 to the next horizontal row of ducts 5 therebelow, and so on for the total number of horizontal pipes, there being a different horizontal row of ducts 5 for which each horizontal pipe serves as a header. Correspondingly each vertical header pipe has a plurality of inlet orifices 16 each of which is connected to a different duct 5 of a corresponding vertical row of ducts 5. Each vertical row of ducts 5 has one duct 5 in common with each of the horizontal rows of ducts 5, the common duct for each vertical row being different from those of the other vertical rows. For example, the vertical pipe 10 is connected with the left hand vertical row of ducts 5 in Fig. 1, and each one of the ducts 5 in this vertical row is from a different one of the horizontal rows of ducts 5.

Connected to the header pipes of the co-ordinate system respectively are suitable water vapor detecting and indicating means. These detecting means 17 are arranged one to each pipe so as to detect the presence of water vapor in the helium gas passing through the associated pipe. All of the pipes are connected to a common pipe line 18 which in turn is connected to the inlet side of a pump 19, the discharge or pressure side of the pump being being connected to the rear of the reactor by a return line or pipe 20. Upon operation of the pump 19, the helium gas which is supplied within the reactor casing or shield is withdrawn from the ducts 5 continuously, or when desired, through the coordinate system of pipes and recirculated through the reactor through the pipe line 20 which is connected to the rear thereof. The detectors 17, in the form illustrated, are not responsive to helium but are responsive to water vapor. Consequently if the helium passing through the detectors contains water vapor, it can be indicated by the suitable indicators, later to be described, one of which is connected to each detector.

Since each duct 5 is connected to one horizontal and one vertical pipe, it is apparent that the indication of the presence of water vapor by a detector associated with a horizontal pipe and by one associated with a vertical pipe fixes the exact co-ordinates of the duct 5 from which the water vapor has been drawn, thus not only detecting the presence of the water vapor but also locating its position in the mass of moderator material.

If desired, a similar coordinate structure may be arranged at an adjacent face of the reactor and be connected with ducts similar to the ducts 5 but which extend across the reactor in a desired position in relationship to the longitudinal ducts 5 heretofore described. Thus, a solid geometric system of co-ordinates instead of a plane system is readily obtained by the mere duplication of the plane system described and installation thereof in a different position.

While the present invention has been described for purposes of illustration in connection with a neutronic reactor for the detection of the presence of water in the moderator, it is apparent that it is useful without change in operating characteristics for other purposes. For example, it may be used to determine the presence and location of any fluid in a pre-selected space; the contamination of a pile of loose material or mass of materials whether due to exterior or interior causes; the mixing of liquids; the presence of any foreign fluid in a given mass or space; the determination of temperatures throughout piles of loose organic materials; and the degree of concentration of different agents in a liquid mass. Similarly, the utility of such a system for the detection and location of leaks from fluid containers other than tubes or pipes will be obvious.

These various uses depend of course upon the selection of a detector responsive to the particular condition which it is desired to detect and locate.

For the detection and location of water vapor in the helium circulated through a reactor, the indicator illustrated in Figs. 5 through 12 has been found satisfactory. This indicator comprises a tapered tube 21 which may be of plastic or other material which does not absorb moisture. Along a portion of the tube 21 is a double helix, the wires of which are indicated at 22 and 23 respectively. The wire used is preferably platinum or palladium. A thin coating of $CaCl_2$, indicated at 24, is applied over the wire so as to hold the adjacent turns of the two helixes in accurately spaced relationship with respect to each other. $CaCl_2$ is used because it absorbs moisture readily and is electrically conductive in relation to its water or moisture content. Furthermore it is a reversible dry agent. However, any other reversible dry agent having a suitable variation in electrical conductivity in accordance with moisture absorption may be used. The tube 21 with the assembled double helix thereon is mounted within a suitable hollow valve plug 25 which has inlet and outlet ports 26 and 27 respectively which extend from its outer surface into its interior or central bore. A valve body 28 having inlet and outlet ports 29 and 30 respectively for registry with the ports 25 and 26 is arranged to receive the valve plug 25 and permit its rotation to align or offset the ports 26 and 27 respectively and the ports 29 and 30. Valve bodies 28 are connected respectively in the pipe lines 6 through 14 inclusive, one being connected in each line through the ports 29 and 30. Thus when it is desired to test the condition of the reactor, the valve plugs 25 are turned to open position and the helium in the system passes through the valves into contact with the $CaCl_2$ of the tube 21. If moisture is present in the helium gas being circulated, it is absorbed by the $CaCl_2$ which thereupon becomes conductive and closes a circuit across the double helix. The circuit of each detector is connected in any conventional manner with a suitable indicating or signalling device 30a which operates when energized, suitable control relay circuits being provided in the circuits with the double helixes where desired to permit operation of the signalling devices by an external source of power in response to the conductivity between the coils 21 and 22 of the helixes.

The particular detector described, being readily removable from the apparatus, may be dried after removal and reused. Thus, a large number of locations may be indicated with only a very limited number of detectors.

Instead of the indicators described, an indicator such as illustrated in Figs. 13 through 16 may be used. This modified indicator comprises a tapered tube 31 having a central bore in which is mounted a hook 32 which is connected to the end of the wire 33 of an external electric circuit. A reversely disposed hook 34, connected on the end of a coil spring 35 which, in turn, is connected to a wire 36 of an external circuit is located within the bore. The two hooks 32 and 34 are arranged to interhook with each other due to the tension of the spring 35 but are normally held apart by a bead 38 of $CaCl_2$ or other material which becomes softened by the absorption of water vapor. Suitable inlet and outlet ports 39 and 40 are provided for admitting the helium gas from the reactor into contact with the bead 38. The tube 31 may be mounted in sealed fitting relationship in a valve plug 41 which is rotatably mounted in a suitable valve body 42 in the same manner and for the same purpose as described in connection with tube 24, valve plug 27 and valve body 28. Thus upon the passage of the helium gas from the reactor ducts through the tube 31, the bead 38 of $CaCl_2$ softens under the influence of any moisture in the helium and breaks down permitting the spring 35 to draw the hook 34 firmly into contact with the hook 32 for completing a circuit.

Suitable indicating or signalling means and conventional relay circuits where necessary are connected in circuit with each of the detectors 17. If the modified detector is used, one indicator is connected in the circuit with each set of the wires 33 and 36. This modification of the invention has the one disadvantage that it is more difficult to restore the bead 38 after it is softened than to dry the $CaCl_2$ coating on the tube 21 heretofore described.

Obviously, in cases where it is desirable to detect and locate different conditions, such as the presence of a different fluid or agent, or of a heat condition in a mass of material, and the like, a suitable detecting means for that purpose may be substituted for the moisture detector herein described.

While the invention has been described specifically for water vapor in the moderator of a neutronic reactor, its uses for other purposes is readily apparent from the description and the invention is not limited to the specific illustration.

Having thus described the invention what is claimed is:

1. A system for locating and detecting the presence of a fluid from a plurality of fluid containers in a mass of material comprising a plurality of fluid ducts at mutually spaced positions in said mass, one duct being adjacent each container, means for conducting leakage fluid from each of the containers to an adjacent duct, a plurality of headers, each of said ducts being connected to a different plurality of said headers, and means for indicating the presence of the fluid in respective headers, whereby the coincidence of appearance of the fluid in the headers indicates the point of origin of the fluid in the mass.

2. A device for detecting and locating leaks in a system having a plurality of containers having generally parallel axes lying in several planes, said device comprising a plurality of ducts each adjacent a given container and having generally parallel axes arranged to intersect a plane normal to said axes at points lying generally on two sets of parallel lines, the lines of one set extending transversely to the lines of the other set, each point lying generally at an intersection of one line of one set with one line of the other set, means for conducting leakage fluid from each of the containers to an adjacent duct, two sets of headers, the headers of one set being parallel to one another and extending transversely of the headers of the other set, the headers of the other set being generally parallel to one another, each header of a given set being connected to a plurality of ducts to which no other header of the same set is connected, each duct being connected to a single header of one set and to a single header of the other set, no other duct being connected to the same two headers, and means for indicating the presence of fluid in each of said headers, whereby the indications of fluid in a header of one set and of fluid in a header of the other set constitute an indication of fluid in the only duct connected to just those headers.

3. In a system for indicating and locating fluid leakage from a plurality of fluid containers, a plurality of ducts, one duct being adjacent to each container, means for conducting leakage fluid from the containers into respective ducts, two sets of headers, means for connecting each of said ducts to one and only one header of each set, and means for indicating the presence of fluid in each of the headers, whereby an indication of fluid in a header of one set combines with an indication of fluid in a header of the other set to give an indication of fluid in that duct connected with these two headers.

References Cited in the file of this patent

UNITED STATES PATENTS

| | | |
|---|---|---|
| 374,850 | Reinmann | Dec. 13, 1887 |
| 882,141 | Cope | Mar. 17, 1908 |
| 1,252,488 | Payne | Jan. 8, 1918 |
| 1,474,071 | Crowther | Nov. 13, 1923 |
| 1,693,737 | Weldon | Dec. 4, 1928 |
| 2,459,535 | Kopischiansky | Jan. 18, 1949 |

FOREIGN PATENTS

| | | |
|---|---|---|
| 233,011 | Switzerland | Oct. 2, 1944 |